United States Patent [19]

Kawabata et al.

[11] Patent Number: 4,471,811
[45] Date of Patent: Sep. 18, 1984

[54] LINEAR SOLENOID-OPERATED VALVE FOR USE IN POWER STEERING SYSTEM

[75] Inventors: Minoru Kawabata, Aichi; Mikio Suzuki, Hekinan; Yutaka Mori, Toyokawa, all of Japan

[73] Assignee: Toyoda Koki Kabushiki Kaisha, Aichi, Japan

[21] Appl. No.: 357,895

[22] Filed: Mar. 15, 1982

[30] Foreign Application Priority Data

Apr. 23, 1981 [JP] Japan .................................. 56-61701

[51] Int. Cl.³ ...................... F16K 31/06; F16K 47/04
[52] U.S. Cl. ................................ 137/625.38; 91/437; 251/117; 251/141; 251/282
[58] Field of Search ..... 91/436, 437; 251/117, 251/141, 282; 137/625-638; 137/625-3, 180/142, 143

[56] References Cited

U.S. PATENT DOCUMENTS

| 2,541,176 | 2/1951 | Rockwell | 137/625.3 |
| 2,625,953 | 1/1953 | Miller | 137/625.3 |
| 3,684,238 | 8/1972 | Michellone | 251/282 X |
| 3,948,338 | 4/1976 | Toshioka et al. | 180/79.2 R |
| 4,274,504 | 6/1981 | Kawabata et al. | 180/143 |

Primary Examiner—Irwin C. Cohen

Attorney, Agent, or Firm—Oblon, Fisher, Spivak, McClelland & Maier

[57] ABSTRACT

A solenoid-operated valve particularly for use in a speed-responsive power steering system on a motor vehicle comprises a valve housing having two ports opening into a bore in the housing, a spool axially slidable in the bore and slot defining a bypass passageway extending between the two ports and variable in cross section upon axial movement of the spool. The spool is spring-biased in a direction to close the bypass passageway, but attractable by an energized solenoid to open the bypass passageway when the solenoid is supplied with an electric current dependent on the speed of travel of the vehicle. The spool has therein a restrictor disposed in the bypass passageway adjacent to the slot to restrict the flow of a fluid through the bypass passageway into and out of the bore in the housing. The restrictor develops a pressure drop while the fluid flows through the bypass passageway to maintain the spool substantially in equilibrium while the fluid under pressure flows through the bypass passageway in either direction upon axial shifting of the spool. The solenoid-operated valve enables dirigible wheels to be assisted in getting turned to the right or left by equal or balanced steering forces generated by the power steering system.

4 Claims, 5 Drawing Figures

LINEAR SOLENOID-OPERATED VALVE FOR USE IN POWER STEERING SYSTEM

BACKGROUND OF THE INVENTION

The present invention relates to a solenoid-operated valve responsive to an electric current supplied to a solenoid or coil for linearly controlling the pressure of a fluid flowing from a high-pressure passage into a low-pressure passage, and more particularly to such a linear solenoid-operated valve for use in a speed-responsive power steering system for motor vehicles which is capable of controlling the steering power in response to the speed of travel of the motor vehicle.

SUMMARY OF THE INVENTION

It is an object of the present invention to provide an improved linear solenoid-operated valve having a spool including a restrictor for eliminating unbalanced application of fluid pressures on the spool.

Another object of the present invention is to provide an improved linear solenoid-operated valve for use in a speed-responsive power steering system for allowing dirigible wheels to be turned rightward and leftward with balanced steering forces.

A linear solenoid-operated valve for use in a speed-responsive power steering system according to the present invention comprises a restrictor which is mounted in a bypass passageway in a spool axially slidable in a valve housing and which is disposed adjacent to a slot defined in one or inner end of the spool. The restrictor serves to restrict the flow of a fluid through its orifice and a constricted flow path defined between the bottom of the slot and the adjacent end of the restrictor, causing the fluid flow to undergo a pressure drop while going past the restrictor. The restrictor develops forces tending to bias the spool to be shifted in a direction which is opposite to that in which the spool itself is subjected to fluid pressures so that the spool is substantially kept under balanced fluid pressures as it is shifted in the valve housing while a fluid under pressure flows through the bypass passageway in either direction.

BRIEF DESCRIPTION OF THE DRAWINGS

The above and other objects, features, and advantages of the present invention will become more apparent from the following detailed description when taken in conjunction with the accompanying drawings in which a preferred embodiment of the present invention is shown by way of illustrative example.

DETAILED DESCRIPTION OF THE PREFERRED EMBODIMENT

Figure 1:
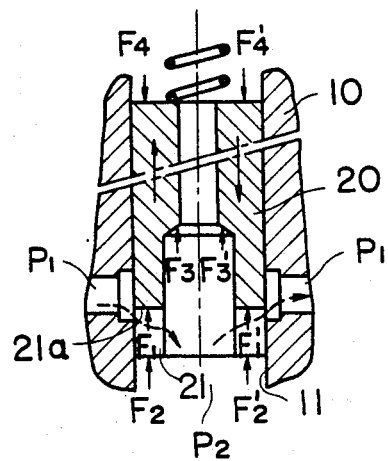
FIG. 1 is a fragmentary cross-sectional view of a conventional linear solenoid-operated valve.

FIG. 1 illustrates a conventional linear solenoid-operated valve comprising a valve housing 10 having a bore 11 in which there is axially slidably fitted a cylindrical spool 20 having in an inner end thereof a slot 21 extending diametrically thereacross. The valve housing 10 has a first passage P1 opening into the bore 11 and a second passage P2 extending through the bore 11. The slot 21 serves as a bypass passageway that extends between the first and second passages P1, P2 and that is variable in cross section as the spool 20 moves axially in the bore 11 to cause the slot 21 to traverse the first passage P1.

Figure 5:
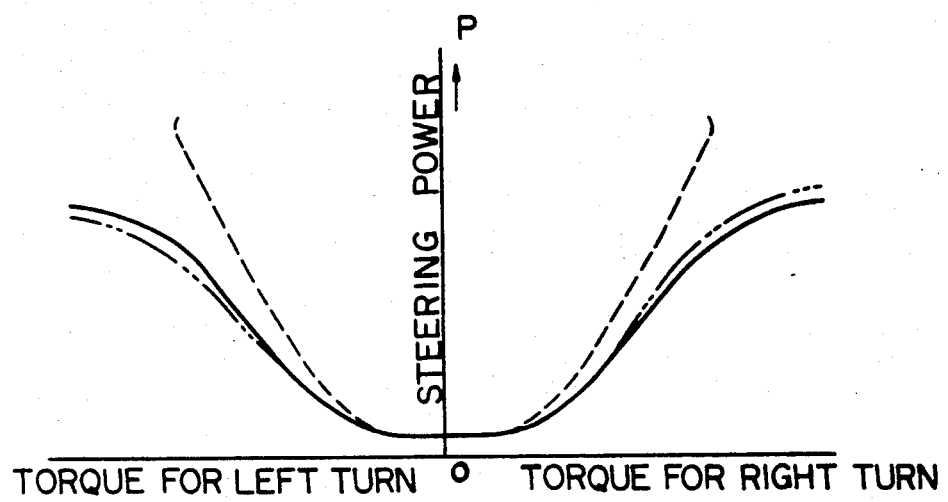
FIG. 5 is a graph showing steering forces generated by the power steering system, as plotted against steering torques.

When a fluid under high pressure flows from the first passage P1 through the bypass passageway into the second passage P2 as the spool 20 is shifted, the spool 20 undergoes low fluid pressures F2, F3, and F4 in the second passage P2 at axial ends thereof except a bottom 21a of the slot 21, which is subjected to a fluid pressure F1 that becomes smaller. As a result, the spool 20 is kept under the combined pressures of F1, F2, F3, and F4 which have the relationship of $F1+F2+F3>F4$, and is biased thereby to be shifted upwardly as shown in the lefthand half of FIG. 1. Conversely, when a fluid under high pressure is supplied from the second passage P2 through the bypass passageway into the first passage P1, the spool 20 is put under high fluid pressures of $F'2$, $F'3$, and $F'4$ in the second passage P2 at the axial ends thereof except the bottom 21a which undergoes a fluid pressure of $F'1$ that becomes reduced to a lower pressure. Consequently, the axial ends of the spool 20 are subjected to the combined pressures of $F'1$, $F'2$, $F'3$ and $F'4$ which have the relationship of $F'1+F'2+F'3<F'4$. The spool 20 is thus urged to move downwardly as shown in the righthand half of FIG. 1.

Where the linear solenoid-operated valve 20 illustrated in FIG. 1 is incorporated in a known speed-responsive power steering system, the dirigible wheels of a motor vehicle will be turned rightward and leftward under unbalanced or uneven steering forces generated by the power steering system, as shown by the two-dot-and-dash line in FIG. 5, because of different pressures imposed on the spool 20 as the high pressure fluid flows in varying directions.

A linear solenoid-operated valve according to the present invention is designed in an effort to eliminate the foregoing prior difficulty, and will now be described in detail with reference to FIGS. 2 through 5.

Figure 2:
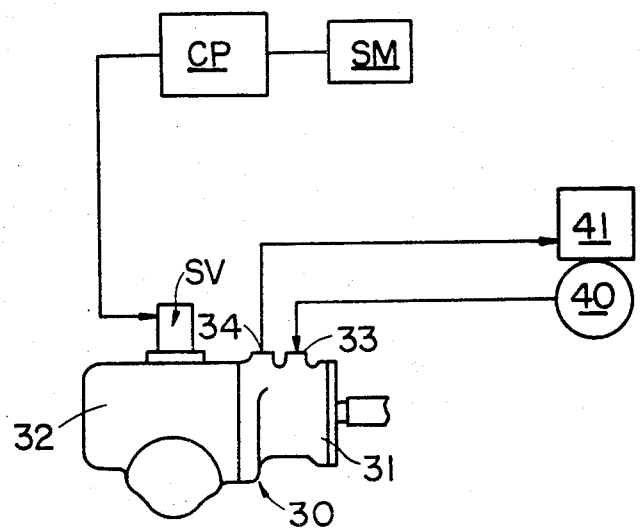
FIG. 2 is a diagrammatic view of a speed-responsive power steering system in which a linear solenoid-operated valve according to the present invention is incorporated.

As shown in FIG. 2, a speed-responsive power steering system for use on a motor vehicle comprises a power steering apparatus 30 including a valve housing 31 containing a servo valve therein and a power cylinder 32 connected to the valve housing 31. When a steering wheel is turned, the servo valve coupled thereto is actuated to allow fluid under pressure to be supplied from a pump 40 through an inlet port 33 into one of the chambers in the power cylinder 32, while at the same time fluid is discharged out of the other cylinder chamber through an outlet port 34 into a reservoir or tank 41.

A linear solenoid-operated valve SV of the present invention is mounted on the power cylinder 32 for selectively providing fluid communication between the chambers in the power cylinder 32 in response to the speed of travel of the motor vehicle in which the power steering system is incorporated. The linear solenoid-operated valve SV is connected via a computer CP to a speedmeter SM which includes a reed switch (not shown) for generating a pulsed signal dependent on the car speed in response to rotation of a magnet actuated by the output shaft of a transmission (not illustrated).

The computer CP converts the pulsed signal fed from the reed switch into an electric current dependent on the frequency of the signal or proportional to the speed of travel of the vehicle, and supplies the current to the linear solenoid-operated valve SV.

Figure 3:
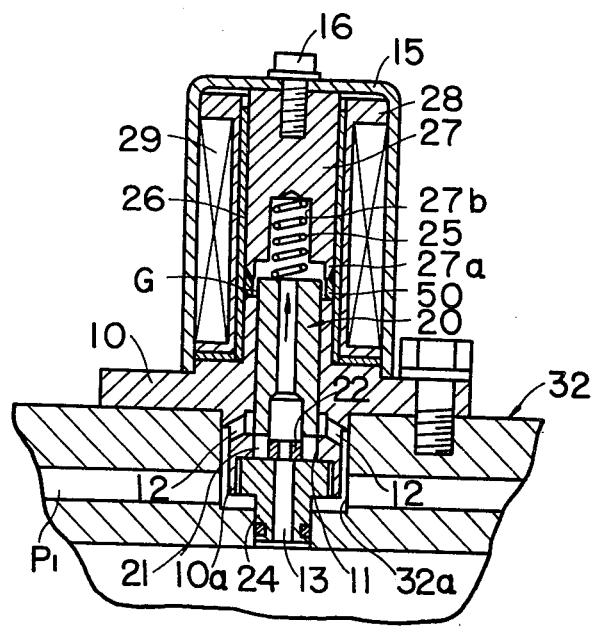
FIG. 3 is a cross-sectional view of the linear solenoid-operated valve shown in FIG. 2.

FIG. 3 shows in detail the construction of the linear solenoid-operated valve SV. The linear solenoid-operated valve SV comprises a valve housing 10 of magnetic material having a cylindrical projection 10a fitted in a liquidtight manner in a large-diameter portion of a through hole 32a defined radially through a peripheral wall of the power cylinder 32. The cylindrical projection 10a has a port 12 opening into a passage P1 in the power cylinder 32 which communicates with the lefthand chamber in the power cylinder 32, and a bore 11 held in communication with the port 12. A union 24 of nonmagnetic material such as stainless steel is threaded in an inner end of the cylindrical projection 10a, the union 24 having an inner end fitted in a small-diameter portion of the through hole 32a in a liquidtight manner. The union 24 has a port 13 having one end opening into the right-hand chamber in the power cylinder 32 and the other end opening into the bore 11 in the valve housing 10.

The valve housing 10 includes an outer projection to which there is fixed as by brazing a sleeve 26 housing a yoke 27 of magnetic material fitted therein. A spacer ring 50 is interposed between an inner end of the yoke 27 and an outer end of the valve housing 10. The yoke 27 has on its inner end a cylindrical portion 27a receptive therein of the outer end of a cylindrical spool 20 which is axially movable therein for a certain stroke. A solenoid or coil 29 is disposed around a bobbin 28 of nonmagnetic material fitted over the sleeve 26. The solenoid 29 is covered with a cover 15 of magnetic material having one or inner end held in abutment against the valve housing 10, the cover 15 being secured in position by a screw 16 threaded into an upper end of the yoke 27.

The cylindrical spool 20 is made of magnetic material and slidably fitted in the bore 11 in the valve housing 10. The spool 20 is normally urged to move downwardly into engagement with the union 24 under the resiliency of a coil spring 25 of stainless steel accommodated in an axial hole 27b in the yoke 27. The spool 20 has in its inner end bypass slots 21, 21 extending radially thereof and having a predetermined depth or axial length. When the spool 20 is in its lowest position, it blocks communication between the slots 21 and the port 12. Upward movement of the spool 20 allows a bypass passageway to be defined by the slots 21 between the ports 12, 13. A restrictor 22 having an axial orifice therethrough is mounted in the spool 20 and disposed adjacent to the slots 21, 21 for restricting the flow of a fluid through its orifice and a constricted flow path defined between bottoms 21a of the slots 21 and an upper end of the restrictor 22 into and out of the bore 11. When a fluid flows through the bypass passageway between the ports 12, 13, it undergoes a pressure drop while going through the orifice in the restrictor 22 and the constricted flow path, with the result that different fluid pressures will be exerted on the ends of the restrictor 22.

The spool 20 is spaced at its upper end radially from an inner peripheral surface of the cylindrical portion 27a of the yoke 27 by a gap or clearance G across which the spool 20 confronts the yoke portion 27a while the spool 20 is shifted upwardly.

Operation of the linear solenoid-operated valve SV thus constructed is as follows: When the solenoid 29 is supplied with an electric current the magnitude of which is dependent on the speed of travel of the vehicle and which is fed from the computer CP, there are generated magnetic fluxes passing through the solenoid 29, the cover 15, the valve housing 10, the spool 20, the gap G, the yoke 27, the cover 15 and the solenoid 29. The magnetic fluxes thus produced cause the spool 20 to be shifted in the direction of the arrow (FIG. 3) under an attractive force that is proportional to the current flowing through the solenoid 29. Where the speed of the vehicle is lower than a predetermined threshold value, the spool 20 remains in its lower position under the force from the coil spring 25, cutting off fluid communication between the ports 12, 13 which are led respectively to the chambers in the power cylinder 32.

When the motor vehicle runs faster than the predetermined threshold speed, the solenoid 29 produces an attractive force which is large enough to overcome the resiliency of the spring 25, shifting the spool 20 axially in the upward direction. The slots 21, 21 now open into the port 12 to thereby establish the bypass passageway between the ports 12, 13. Since the cross-sectional area of the bypass passageway varies linearly dependent on the magnitude of the current flowing through the solenoid 29, the amount of a bypassing fluid flowing through the bypass passageway between the chambers in the power cylinder 32 will be increased as the car speed becomes higher. The steering power generated by the power steering system, with which the dirigible wheels of the vehicle are assisted in getting turned, is therefore variable linearly with the speed of travel of the vehicle so as to render the vehicle stabler or heavier with respect to its steering action at higher car speeds.

Figure 4:
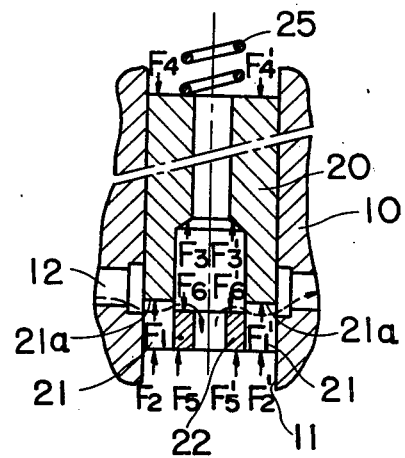
FIG. 4 is an enlarged fragmentary cross-sectional view of the linear solenoid-operated valve.

When a fluid under high pressure flows from the passage P1 through the bypass passageway into the righthand chamber in the power cylinder 32 upon shifting movement of the spool 20, a portion of such high-pressure fluid is caused to flow through the constricted flow path between the bottoms 21a and the upper end of the restrictor 22 and also through the orifice in the restrictor 22, whereupon the fluid is subjected to a pressure drop while passing past the restrictor 22, as shown in a dotted line in the lefthand half of FIG. 4. At this time, different pressures $F_5$, $F_6$ ($F_5 < F_6$) are imposed upon the ends of the restrictor 22, whereas the ends of the spool 20 itself are subjected to fluid pressures $F_1$, $F_2$, $F_3$ and $F_4$ ($F_1 + F_2 + F_3 > F_4$). The spool 20 is put under the combined pressures of $F_1$, $F_2$, $F_3$, $F_4$, $F_5$, and $F_6$, which have the relationship of $F_1 + F_2 + F_3 + F_5 \approx F_4 + F_5$, a condition under which the spool 20 is substantially in equilibrium. Conversely, when a fluid under high pressure flows from the righthand chamber in the power cylinder 32 through the bypass passageway into the passage P1 as the spool 20 is shifted, a portion of the high-pressure fluid is forced to flow through the orifice in the restrictor 22 and the constricted flow path, as shown in a dotted line in the righthand half of FIG. 4, during which time the fluid undergoes pressure drop. The restrictor 22 is placed under pressures $F'_5$, $F'_6$ ($F'_5 > F'_6$) acting on its ends. At the same time, the ends of the spool 20 is subjected to pressures of $F'_1$, $F'_2$, $F'_3$, and $F'_4$ ($F'_1 + F'_2 + F'_3 < F'_4$). The spool 20 is therefore put in substantial equilibrium under the combined pressures which have the relationship of $F'_1 + F'_2 + F'_3 + F'_5 \approx F'_4 + F'_6$.

Stated otherwise, the restrictor 22 is subjected at all times to forces applied in directions which are opposite to those in which the spool 20 undergoes fluid pressures, that is, upward and downward directions as shown in FIGS. 3 and 4. The restrictor 22 thus cancels out forces imposed on the spool 20 which would differ dependent on the direction in which a fluid under pressure would flow on shifting movement of the spool 20. With the linear solenoid-operated valve SV incorporated, the speed-responsive power steering system produces substantially equal steering forces with which the steering wheel is assisted in being turned clockwise or counterclockwise, as illustrated in a solid line in FIG. 5.

Althrough a certain preferred embodiment has been shown and described in detail, it should be understood that various changes and modifications may be made therein without departing from the scope of the appended claims.

What is claimed is:

1. A solenoid-operated valve comprising:
   a housing having a bore and two ports opening into said bore for allowing fluid under pressure to flow through said bore selectively in either direction;
   a cylindrical spool axially slidably disposed in said bore and having an axial through hole and a slot formed at one end thereof, said slot extending radially of said spool to open into said through hole and defining a bypass passageway which extends between said ports and which is variable in cross section upon axial movement of said spool in said bore;
   a spring urging said spool in a direction to close said bypass passageway;
   a solenoid mounted on said housing energizable by an electric current proportional to a variable quantity for shifting said cylindrical spool under magnetic forces in a direction to open said bypass passageway against the resiliency of said spring; and
   a restrictor means provided at said one end of said cylindrical spool and formed with an orifice for dividing said bypass passageway into two routes one of which permits said two ports to communicate with each other only through a first part of said slot and the other of which permits said two ports to communicate with each other through a second part of said slot, said through hole and said orifice.

2. A solenoid-operated valve according to claim 1, wherein:
   each of said first and second parts of said slot serves to restrict the flow of fluid under pressure therethrough.

3. A solenoid-operated valve according to claim 2, wherein:
   said slot and said restrictor means respectively have a bottom and an axial end which jointly define a constricted flow path for restricting the flow of fluid under pressure between said second part of said slot and said through hole.

4. A solenoid-operated valve according to claim 1, wherein:
   said restrictor means is mounted in said through hole at said one end of said cylindrical spool; and
   said slot formed at said one end of said cylindrical spool extends longer than said restrictor means in an axial direction of said cylindrical spool for permitting the flow of fluid under pressure between said second part of said slot and said through hole.

* * * * *